(12) United States Patent
Marx et al.

(10) Patent No.: US 6,547,210 B1
(45) Date of Patent: Apr. 15, 2003

(54) SACRIFICIAL INSERT FOR INJECTION MOLDING

(75) Inventors: Jeffrey G. Marx, Downingtown, PA (US); Bradley R. Heckendorf, Menomonie, WI (US); Brian L. Norberg, Durand, WI (US)

(73) Assignee: Wright Medical Technology, Inc., Arlington, TN (US)

( * ) Notice: Subject to any disclaimer, the term of this patent is extended or adjusted under 35 U.S.C. 154(b) by 0 days.

(21) Appl. No.: 09/505,962

(22) Filed: Feb. 17, 2000

(51) Int. Cl.$^7$ .............................................. B28B 7/28
(52) U.S. Cl. ....................................... 249/175; 249/63
(58) Field of Search ........................... 249/63, 64, 175; 264/317

(56) References Cited

U.S. PATENT DOCUMENTS

| | | | |
|---|---|---|---|
| 3,731,901 A | 5/1973 | Holdredge, Jr. | 249/180 |
| 3,882,220 A | 5/1975 | Ryder | 264/221 |
| 4,094,688 A | 6/1978 | Wolf | |
| 4,343,757 A | 8/1982 | Popplewell | 264/221 |
| 4,464,324 A | 8/1984 | Hager | 264/221 |
| 4,614,627 A | 9/1986 | Curtis et al. | 264/46.6 |
| 4,743,481 A | 5/1988 | Quinlan et al. | 428/36 |
| 4,752,857 A * | 6/1988 | Khoury et al. | 361/321 |
| 4,827,589 A | 5/1989 | Friedrichs | 29/156.4 R |
| 4,870,148 A | 9/1989 | Belz et al. | 526/318.41 |
| 4,891,175 A | 1/1990 | Haines | 264/154 |
| 4,938,679 A | 7/1990 | Pietrorazio | 425/437 |
| 4,956,142 A | 9/1990 | Mangone, Jr. | 264/318 |
| 4,990,146 A | 2/1991 | Deibig et al. | 604/332 |
| 5,089,186 A | 2/1992 | Moore et al. | 264/25 |
| 5,143,665 A | 9/1992 | Clubbs et al. | 264/221 |
| 5,169,577 A | 12/1992 | Feichtinger | |
| 5,173,237 A | 12/1992 | Kidd | 264/221 |
| 5,176,866 A | 1/1993 | Tanaka et al. | 264/219 |
| 5,242,646 A | 9/1993 | Torigoe et al. | 264/219 |

(List continued on next page.)

FOREIGN PATENT DOCUMENTS

| | | |
|---|---|---|
| EP | 0 466 664 A | 9/1991 |
| EP | 1 033 193 A | 9/2000 |
| FR | 2321378 A | 3/1977 |
| JP | 07 304057 | 11/1995 |
| WO | WO 90 08637 A | 8/1990 |
| WO | WO 93 17820 A | 9/1993 |

OTHER PUBLICATIONS

Jack Avery, "Section 5.5: Multicomponent Molding," *Injection Molding Alternatives: A Guide for Designers and Product Engineers*, Hanser Gardner Publishers, 1998, pp. 113–117.

(List continued on next page.)

*Primary Examiner*—Christopher A. Fiorilla

(57) ABSTRACT

Sacrificial inserts and molds for use in injection molding are disclosed. In one embodiment a sacrificial insert includes a water-insoluble insert which has a melting temperature greater than the injection molding melt temperature of the base material being molded. In another embodiment, a mold includes one or more of: a sacrificial insert configured to form interior features of the object; a sacrificial insert configured to form interior and exterior features of the object; and a combination of a sacrificial insert configured to form exterior features of the object and a tool configured to form interior features of the object. In another embodiment, a multi-shot injection molding process includes: providing a support base containing a tool; injecting a first material into the support base to form an integral tool and sacrificial insert; separating the tool from the sacrificial insert; retaining the sacrificial insert in the support base, or inserting the sacrificial insert into another support base optionally having a further sacrificial insert or tool; injecting a second material into the support base containing the sacrificial insert to form an integral sacrificial insert and molded object; and destructively disengaging the sacrificial insert from the molded object without substantially damaging the molded object. In another embodiment, a sacrificial insert is used to injection mold a metal or ceramic object.

1 Claim, 1 Drawing Sheet

U.S. PATENT DOCUMENTS

| | | | |
|---|---|---|---|
| 5,248,552 A | 9/1993 | Moore et al. | 428/323 |
| 5,249,618 A | 10/1993 | Burkarth et al. | |
| 5,433,912 A | 7/1995 | Schulz et al. | 264/297.2 |
| 5,595,771 A | 1/1997 | Foltuz et al. | 425/443 |
| 5,614,232 A | 3/1997 | Torigoe et al. | 425/545 |
| 5,630,977 A | 5/1997 | Catalanotti et al. | 264/318 |
| 5,656,234 A | 8/1997 | Kaneishi et al. | 264/572 |
| 5,658,515 A | 8/1997 | Lee et al. | 264/219 |
| 5,681,518 A | 10/1997 | Ashcraft | 264/221 |
| 5,702,660 A | 12/1997 | Allott et al. | 264/242 |
| 5,824,250 A | 10/1998 | Whalen et al. | 264/219 |
| 5,878,496 A | 3/1999 | Liu et al. | 29/898.066 |
| 5,906,234 A | 5/1999 | Mastrorio et al. | 164/45 |
| 5,972,269 A * | 10/1999 | Barros et al. | 264/221 |
| 5,997,230 A | 12/1999 | Dodd et al. | 411/383 |

OTHER PUBLICATIONS

Mike Tolinski, "Process Selection for Multi–Shot Molding," *Molding Systems*, vol. 56, No. 1, Jan. 1998, pp. 30–35.

"Choosing a Multi–Material Molding Process".

P. Coates, "Multi–Shot Values," *Plastics and Rubber Weekly*, No. 1789, Jun. 4, 1999, p. 7.

J. Hahn, "Case Study for Multi–Shot," *Antec *99 Conference Proceedings*, New York City, May 2–6, 1999, pp. 406–410.

J. Tinson, "Multi–Shot Injection Moulding," *Medical Device Technology*, No.3, Apr. 1998, pp. 26–28.

* cited by examiner

SACRIFICIAL INSERT FOR INJECTION MOLDING

BACKGROUND OF THE INVENTION

1. Field of the Invention

The present invention relates to injection molding in general, and in particular to molding with sacrificial inserts, particularly for ceramic and metals.

2. Description of the Known Art

Injection molding is used to manufacture articles of complex geometry. This method is useful for plastic parts as well as metal and ceramic parts prepared by powder injection molding. Injection molding while being generally economical for large volumes of parts can be uneconomical for short-run or prototype production. Moreover, obtaining certain features such as undercuts and blind holes in certain orientations in an injection molded part is either difficult or impossible, or requires complex and expensive tooling.

There are numerous examples of the use of complex tooling solutions such as expanding cores, see, e.g., Holdred, "Expandable Core Assembly," U.S. Pat. No. 3,731,901; Catalanotti, and Tarahomi, "Injection molding method and system with expandable cavity element," U.S. Pat. No. 5,630,977; Pietrorazio, "Collapsible core for molding closures having interrupted interior threads and the like," U.S. Pat. No. 4,938,679; and Mangone, "Apparatus and method for molding three dimensional articles," U.S. Pat. No. 4,956,142, and slides, e.g., Schulz, Kaiser, and Temesvary, "Process for injection molding arcuately-shaped hollow articles," U.S. Pat. No. 5,433,912; Kaneishi, Kiboshi, Mio, and Fukui, "Mold apparatus and injection molding method for producing hollow-structured article by injection molding," U.S. Pat. No. 5,656,234; and Foltuz; and Cohan, "Modular mold for injection molding and method of use thereof," U.S. Pat. No. 5,595,771, for the production of otherwise difficult geometry's of injection molded parts. These tooling solutions allow for the molding of some geometries, but there are limitations to the complexity of parts possible, and the cost of such tools may be prohibitive.

The known art is also replete with examples of the use of expendable patterns in the forming of complex shapes. The casting industry commonly uses "lost wax," and "lost foam" processes. In these processes, a mold is formed around a shaped material of wax, injection molded plastic, or polymeric foam. It is the purpose of this material to form the cavity and be vaporized upon casting of the molten metal. See, e.g., U.S. Pat. No. 5,906,234.

U.S. Pat. Nos. 5,614,232 & 5,242,646 to Torigoe et al. describe methods for making fasteners by injection molding in which a sacrificial stem mold is used for defining exterior contours. U.S. Pat. No. 5,824,250 to Whalen et al. describes gel cast ceramic manufacturing using a fugitive mold. U.S. Pat. Nos. 5,248,552 & 5,089,186 to Moore et al. describe a method for removing a core from a cast molded product, which is an inert particulate material with a water soluble carbohydrate binder. U.S. Pat. No. 5,681,518 to Ashcraft describes an injection molding process in which a plurality of different mold components (including core components) of defined contour are formed and combined.

U.S. Pat. No. 5,176,866 to Tanka and U.S. Pat. No. 5,173,237 to Kidd describe molding cores that use low melting point alloys which may be removed from a molded article by heat, such as hot oil. U.S. Pat. No. 4,614,627 to Curtis et al. describes a method for molding a golf club head which uses a fusible core which can be melted out after the injected material sets. U.S. Pat. No. 5,143,665 to Cubbs et al. describe a sacrificial mold used to mold composite materials, plastic or metals.

There is a need, however, for a molding system which utilizes a sacrificial insert which is capable of forming interior features of an injection molded article, and which is able to maintain fidelity of the features being molded under the conditions of injection molding. There is also a need for a mold combination which can use different combinations of sacrificial parts and permanent parts to provide optimum economy when molding articles, particularly articles having complex geometries which are difficult to mold with conventional molds, such as those described above and short-run or prototype molded objects. There is also a need for a multi-shot process which can economically produce short run parts having complex features not normally attainable with conventional multi-shot molds.

SUMMARY OF THE INVENTION

One object of the invention is to overcome the disadvantages of the known art described above. Another object of the invention is to provide a sacrificial insert for injection molding an object, and a mold which includes the sacrificial insert. Yet another object is to provide a method of injection molding an object using a sacrificial insert. Still another object of the invention is to provide a method for producing an object by multi-shot injection molding the object using a sacrificial insert. Yet another object of the invention is to provide a method for forming a molded ceramic object or a molded metal object by injection molding using a sacrificial insert.

In order to achieve the foregoing and further objects, there has been provided according to one aspect of the invention, a sacrificial insert for injection molding an object from a base material, which includes, a water-insoluble insert which has a melting temperature greater than the injection molding melt temperature of the base material. According to another aspect of the invention, there has been provided a mold for making an object by injection molding, which includes, a support base and the sacrificial insert described above, and optionally a tool.

According to yet another aspect of the invention, there has been provided a method of injection molding an object formed of a base material, which includes: providing a mold having the sacrificial insert described; providing the base material in a flowable state; flowing the base material into the mold and into contact with the sacrificial insert; solidifying the base material in the mold to form the molded object; and destructively disengaging the sacrificial insert from the molded object without substantially damaging the molded object.

According to still another aspect of the invention, there has been provided a method of removing a sacrificial insert from a molded object, which includes, subjecting the sacrificial insert described above and the molded object to a treatment sufficient to destroy the sacrificial insert and enable it to be removed from the molded object without substantially damaging the molded object.

According to a further aspect of the invention, there has been provided a mold for making an object by injection molding comprising one or more of: a sacrificial insert configured to form interior features of the object; a sacrificial insert configured to form interior and exterior features of the object; and a combination of a sacrificial insert configured to form exterior features of the object and a tool configured to form interior features of the object.

According to yet another aspect of the invention, there has been provided a method for producing an object comprising, multi-shot injection molding the object which injection molding includes: providing a support base containing a tool; injecting a first material into the support base to form an integral tool and sacrificial insert; separating the tool from the sacrificial insert; retaining the sacrificial insert in the support base, or inserting the sacrificial insert into another support base optionally having a further sacrificial insert or tool; injecting a second material into the support base containing the sacrificial insert to form an integral sacrificial insert and molded object; destructively disengaging the sacrificial insert from the molded object without substantially damaging the molded object.

According to a further aspect of the invention, there has been provided a method for forming a molded ceramic object, which includes: providing a mold having a sacrificial insert; providing a ceramic injection molding feedstock; flowing the ceramic feedstock into the mold and into contact with the sacrificial insert; solidifying the ceramic material in the mold to form an integral green molded ceramic object and sacrificial insert; and subjecting the integral green molded ceramic object and sacrificial insert to a treatment sufficient to destroy the sacrificial insert, whereby the sacrificial insert can be separated from the molded ceramic object without substantially damaging the molded object.

According to a further aspect of the invention, there has been provided a method for forming a molded metal object, which includes: providing a mold having a sacrificial insert; providing a metal injection molding feedstock; flowing the metal feedstock into the mold and into contact with the sacrificial insert; solidifying the metal material in the mold to form an integral green molded metal object and sacrificial insert; and subjecting the integral green molded metal object and sacrificial insert to a treatment sufficient to destroy the sacrificial insert, whereby the sacrificial insert can be separated from the molded metal object without substantially damaging the molded object.

Further objects, features and advantages of the present invention, will become readily apparent from detailed consideration of the preferred embodiments which follow.

DETAILED DESCRIPTION OF THE PREFERRED EMBODIMENTS

Figure 1:
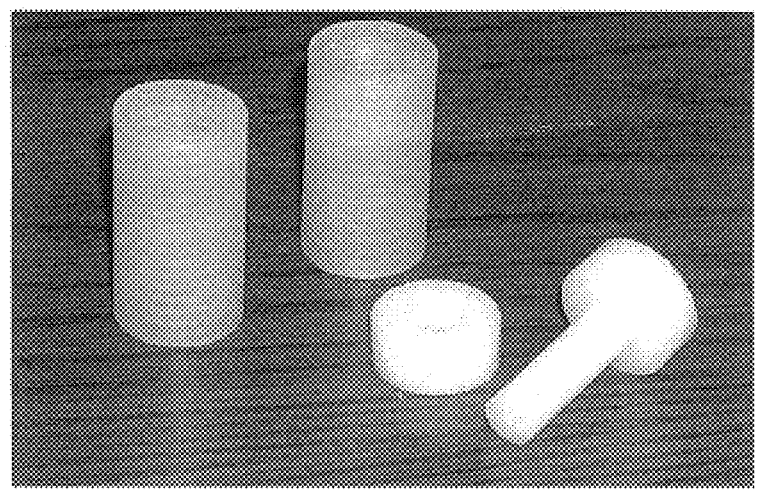
FIG. 1 depicts various sacrificial inserts according to one embodiment of the invention.

The present invention provides a method for injection molding objects, such as parts, with complex geometries. This method allows complex features, particularly interior features, to be added to the object by insert molding with a sacrificial insert. Injection molding using conventional molds is well known, as described in "Injection Molding Handbook" by D. V. Rosato et al. (Chapman & Hall Publishing, $2^{nd}$ edition, 1995) which is incorporated by reference in its entirety.

The sacrificial insert is prepared from a material that will be removed in a later step. By using the present invention, the complexity of tooling may be reduced, and features previously un-moldable can now be molded. Objects with undercuts, and objects which would need numerous slides and other complex features in the tool can be molded directly. A number of similar objects may be molded with the same, or fewer tools with the differentiating features added with the use of sacrificial inserts. The present invention makes it possible to mold a small number of parts, e.g., prototypes with a sacrificial insert(s) in a common mold base.

As used herein, "sacrificial insert" is defined as one or more component(s) designed to form the interior, exterior and both interior and exterior features of the product being molded. The sacrificial insert is designed to be destructively removed from the product without substantially damaging the product after molding. The sacrificial insert can be shaped to form both the female and male mold cavity which forms the outer surface of the molded object. The sacrificial insert can also be shaped to be placed in a mold cavity to form the interior features of molded objects. The sacrificial insert can also include features of conventional molds such as runners for feeding the material being injected into the mold.

A "tool" is defined as one or more durable component(s) such as metal, which may be attached, permanently or removably, to the support base to form interior and/or exterior features of the product being molded or of the sacrificial insert being molded. Unlike the sacrificial insert, the tool is designed to be used for molding more than once. The tool can be those well known in the art, such as mold cavities, cores, collapsible cores, multi-piece elements, etc.

A "support base" is defined as a metal cavity that serves to support the "sacrificial insert" and "tool." In some instances, the support base has no details, and the sacrificial insert and tool are the components which actually form the details of the product being molded. In other instances, the support base may be used to form exterior features of the product being molded, or the sacrificial insert.

A "mold" is defined as comprising at least a combination of two or more of the support base, tool and sacrificial insert.

"Interior feature(s)" are defined as any feature on the inner surface or aspect of the object, such as the undercut of a threaded object or lip.

"Exterior feature(s)" are defined as any feature on the outer surface or aspect of the object.

One embodiment of the invention provides a method and mold for the manufacture of complex parts such as in ceramic, metal or plastic injection molding, with the use of a sacrificial insert, and optionally one or more tools. The part is injection molded with one or more sacrificial insert(s). Following molding, sacrificial insert(s) are removed by a process that does not substantially damage the molded part or object. The tool, if present, is removed and may be saved for subsequent injection molding operations—thus giving shape features to the final part.

According to one preferred embodiment, the sacrificial insert is configured (i.e., shaped) to form the interior features, and optionally the exterior features, of the object being molded. For example, sacrificial inserts, such as a sacrificial mold cavity and an insert for forming an interior cavity of the object, are prepared to fit in a support base for injection molding. Following molding, the molded object and the sacrificial insert(s) are ejected together from the support base. The sacrificial insert is then removed from the part by a process that does not detrimentally affect the molded object. For the next object to be molded, new sacrificial inserts are fitted into the support base, and another object is injection molded as described above. Although, using new sacrificial insert(s), such as a mold cavity, for each object being molded may not seem obviously economical; for prototypes and short production runs, it is more economical than time consuming and expensive machine tooling required for permanent molds made from more typical materials such as metals.

If a tool is used, the tool may be used to form interior and exterior features of the object being molded. A particularly preferred embodiment is using a sacrificial insert to form exterior features and using a tool to form interior features. If the tool cannot be readily removed from the molded object without damaging the molded object, the tool may a multi-piece tool or a collapsible core as described above.

The sacrificial insert may be prepared by any method of production including: injection molding, machining, compression molding, etc. It is preferred that the insert be comprised of a polymeric material. This polymeric material may be either thermoplastic or thermoset. It is further preferred that the insert be injection molded. In the case of injection molding of the insert, the insert may be molded dense, or with a blowing agent to reduce weight and improve surface finish. In one embodiment, the sacrificial insert is injection molded from a thermoplastic with a high melting point. Preferred materials include polyacetal, sold under the tradename, Delrin™, polypropylene, polysulphone, nylon, polyurethane, polycarbonate, and polystyrene.

The sacrificial insert may be removed by mechanical, thermal, non-aqueous solvent, catalytic, sublimation, enzymatic, acid, base or other means of destruction or combinations thereof which destructively disengage(s) the insert without substantially damaging the molded object. "Substantially without damaging the molded object" is defined as the molded object not being degraded mechanically and having no more than minor cosmetic surface flaws, e.g., scratches. Preferably the object has no surface flaws. Preferred combinations of sacrificial inserts/destruction methods include polyacetal/nitric acid atmosphere, polypropylene/heat, and polysulphone/acetone.

In a preferred embodiment, the sacrificial insert is water-insoluble, and the melting temperature of the sacrificial insert is greater than the injection molding melt temperature of the base material that is being molded. A water-insoluble insert will not dissolve or disperse when contacted with an aqueous solution. In the case where the base material being injection molded is a ceramic or metal powder, the injection molding melt temperature is the temperature at which the binder melts. The difference between the melting temperature of the insert and the injection molding melt temperature may be, for example, $\geq 100°$ F., preferably $\geq 200°$ F. Other temperature differences can also be used. In this regard, polysulphone is particularly preferred for some applications in view of its relatively high melting temperature. This higher temperature prevents or reduces deformation of the insert during the injection molding operation.

Preferred combinations of sacrificial insert/material being molded include, polyacetal/ceramic, polypropylene/ceramic, polysulphone/ceramic, nylon/ceramic, polyurethane/ceramic, polycarbonate/ceramic, polystyrene/ceramic, polyacetal/metal, polypropylene/metal, polysulphone/metal, nylon/metal, polyurethane/metal, polycarbonate/metal, and polystyrene/metal Another preferred aspect of the invention is directed to multi-shot molding which can be used to produce one or more sacrificial inserts, which sacrificial inserts are then used subsequently in the multi-shot injection molding process to form the molded object preferably in the same molding cycle. In this aspect, the sacrificial insert is formed in the same process that forms the final molded object. Multi-shot processes are known in the art, and examples can be found in "Injection Molding Alternatives: A Guide for Designers and Product Engineers", Section 5.5: "Multicomponent Molding" by Jack Avery (Hanser Gardner Publishers, 1998, pages 113–117); "Process Selection For Multi-Shot Molding" by Mike Tolinski (Molding Systems, volume 56 number 1, January 1998, p 30–35); "Multi-Shot Values" by P. Coates, (Plastics and Rubber Weekly, No.1789, $4^{th}$ June 1999, p.7); "Case Study for Multi-Shot" by J. Hahn, (Antec *99 Conference Proceedings, New York City, $2^{nd}$–$6^{th}$ May 1999 p.406; and "Multi-Shot Injection Moulding" by J. Tinson, (Med. Device Technol., No.3, April 1998, p.26–8), all of which are incorporated by reference their entireties.

In a typical multi-shot process, the object to be molded is made from more than one material. A first material is injected into a first mold to form a first molded object. The first molded object is then removed from the first mold, and inserted into a second mold, typically by rotating the movable portion of the mold from the first mold to the second mold, into which a second material to be molded is injected to form the final molded object. The final molded object is thus a combination, e.g., laminate, of the first and second materials. Additional analogous molding steps using third, fourth and additional materials can also be employed. These steps preferably all occur within the same molding cycle.

In the present invention, the first molded object may be the sacrificial insert. The sacrificial insert is formed by providing a support base and tool to form a mold. The material which forms the sacrificial insert is then injected into the mold to form the sacrificial insert. The sacrificial insert is then separated from the tool in a manner which does not harm the sacrificial insert. The insert can be retained in the same support base, and a different tool can be employed for the next molding step, such as by rotating a platen containing the support base and sacrificial insert into place with another stationary tool, or alternatively, rotating a platen containing another tool into place with the stationary support base containing the sacrificial insert. Alternatively, the insert can be removed from the support base and inserted into another support base which may contain additional tools and sacrificial inserts. A material which will form the molded object is then injected into the support base containing the sacrificial insert formed at the beginning of the process, as well as optional tools and additional sacrificial insert to form an integral sacrificial insert(s) molded object. As with conventional multi-shot processes, additional injecting steps can be used with additional materials to form the final molded object. The final molded object is then destructively disengaged from the sacrificial insert(s) without substantially damaging the final molded product.

Another aspect of the invention provides a method for molding ceramic or metal objects, using sacrificial inserts. According to this embodiment, a feedstock of a ceramic or metal is first prepared. The feedstock may or may not include one or more binders admixed with the ceramic or metal powder. In a preferred embodiment, a polymeric binder is present. Other additives can include processing aids such as water, plasticizers such as glycerin, release agents, and debinding aids. Fine ceramic or metal powders are preferably hot mixed with the polymeric binder, if present, and the other processing aids, if present. The mixture is then cooled and granulated to form the feedstock. Techniques and compositions for forming ceramic or metal feedstocks are well known in the art, and are described, for example, in U.S. Pat. No. 5,997,230, which is incorporated by reference in its entirety.

The feedstock is then heated to a temperature that is just above the temperature at which the binder starts to flow. The feedstock is fed into an injection molding machine where it is directed into a mold containing one or more sacrificial inserts. The feedstock becomes a solid molded object upon cooling. After the feedstock has solidified, the one or more sacrificial inserts are destroyed without substantially damaging the molded object to form a green molded ceramic or metal object. The methods of destruction can be those described above.

If a polymeric binder is used, then according to a preferred embodiment, the one or more sacrificial inserts are destroyed by heating to a temperature at which the insert decomposes or melts. At the same time, the heating also debinds the green molded object.

After destruction of the insert and optionally debinding, the molded object is then heated to a temperature to effect sintering. Sintering temperatures for most ceramics of relevance to this invention are preferably in the range of about 1100° C. to about 1600° C., and preferred sintering temperatures for metals are in the range of about 800 to about 1400° C.

The present invention may be more easily understood by reference to the following non-limiting examples:

Example 1

Cylinders of Delrin™ were machined such that they would fit into the inner diameter of a cylindrical cavity support base. These Delrin™ cylinders were machined with a bored and tapped inner dimension, as shown in FIG. 1. A hole was drilled through the side to mate with the gate of the support base. In the center of the support base, a tool in the shape of a pin was screwed into the cavity half of the support base.

A ceramic injection molding feedstock was prepared as described above according to the following formulation:

586 g Al2O3

37.7 g parrafin wax 48.47 g polypropylene 5.09 g stearic acid 17.23 g Fusabond®

Figure 2:
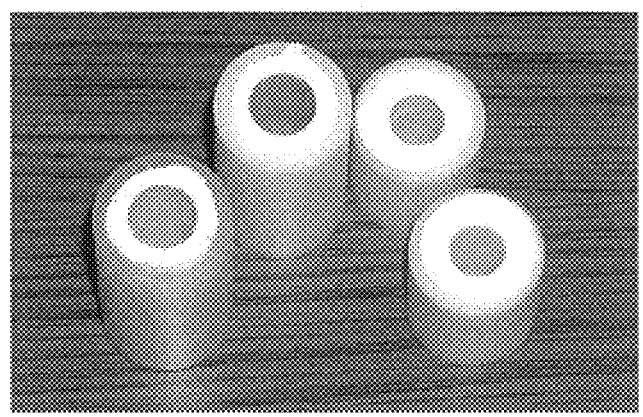
FIG. 2 depicts an integral molded object/sacrificial insert/tool.

The ceramic feedstock was injection molded into these cylinders and around the central pin. The resulting cylinders had a cylindrical internal bore, and a cylindrical outer surface. The integral molded object/sacrificial insert/tool had a green injection molded ceramic, with a Delrin™ exterior and a central pin. The interface between the Delrin™ and injection molded ceramic had the threaded conformation from the tapped Delrin™. The composite molded object/sacrificial insert/tool is shown in FIG. 2.

Figure 3:
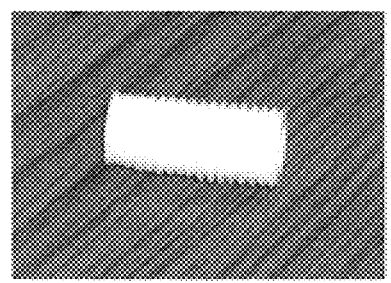
FIG. 3 depicts the molded object after the sacrificial insert has been destructively removed and the tool has been removed.

Cylinders prepared in this fashion were subjected to nitric acid vapor at a temperature of 110° C. for four hours in a specially designed nitrogen atmosphere oven. The effect of this treatment was to catalytically decompose the Delrin™ insert leaving behind the ceramic injection molded object with a threaded outer surface given to the object by the insert. The green ceramic object was then debound in heptane at 60° C. to remove wax, heated to 600° C. to remove the polypropylene and sintered at 1550° C. The features given to the part by the sacrificial insert were retained in the final sintered part as shown in FIG. 3.

Example 2

Cylinders of polypropylene were injection molded in a cylindrical support base with a central pin to yield polypropylene cylinders with a hollow bore. The bores of these polypropylene cylinders were tapped to give internal threads, and the gate section was drilled through to the interior to yield sacrificial inserts. The central pin in the support base was switched to a pin (i.e., tool) with a smaller diameter. The polypropylene sacrificial inserts were then inserted into the support base, and a ceramic composition identical to Example 1 was injection molded between the pin tool and the polypropylene insert. The resulting cylinders had a cylindrical internal bore, and a cylindrical outer surface. The interior was comprised of green injection molded ceramic, with a polypropylene exterior. The interface between the polypropylene and injection molded ceramic had the threaded configuration from the tapped polypropylene. The ceramic injection molded portion of this article was partially debound with the use of heptane at 60° C., and the article was thermally debound at 600° C. and sintered at 1550° C. During the thermal debinding and sintering step, the polypropylene sacrificial insert is thermally destroyed, leaving the ceramic article.

Example 3

Cylinders of polysulphone were injection molded into a blank cylindrical support base with a threaded central pin to yield polysulphone cylinders with internal threads. A gate section was drilled through to the interior to yield a sacrificial insert. The threaded central pin in the support base, was switched to a pin (i.e., tool) with a smaller diameter. The polysulphone sacrificial inserts were then inserted into the support base, and a ceramic composition identical to Example 1 was injection molded between the pin tool and the polysulphone insert. The resulting cylinders had a cylindrical internal bore, and a cylindrical outer surface. The interior was comprised of green injection molded ceramic, with a polysulphone exterior. The interface between the polysulphone and injection molded ceramic had the threaded configuration from the internally threaded polysulphone. The polysulphone/ceramic cylinder was removed from the tool (pin). The ceramic injection molded portion of this article was partially debound with the use of heptane at 60° C. The polysulphone sacrificial insert and injection molded ceramic were immersed in acetone, which has the effect of propagating cracks in the polysulphone. The insert and ceramic were destroyed, and the acetone treated polysulphone was mechanically removed aided by the cracks. The article was thermally debound at 600° C. and sintered at 1550° C.

While a number of preferred embodiments of the present invention have been described, it should be understood that various changes, adaptations and modifications may be made therein without departing from the spirit of the invention and the scope of the appended claims. As used herein and in the following claims, articles such as "the", "a" and "an" can connote the singular or plural.

What is claimed is:

1. A sacrificial insert for injection molding an object from a base material comprising, a water-insoluble insert which has a melting temperature greater than the injection molding temperature of the base material, wherein the sacrificial insert comprises polysulphone.

* * * * *